May 25, 1926.
O. H. GOETZ
1,586,303
AUTOMOBILE BUMPER BRACKET
Filed July 30, 1924
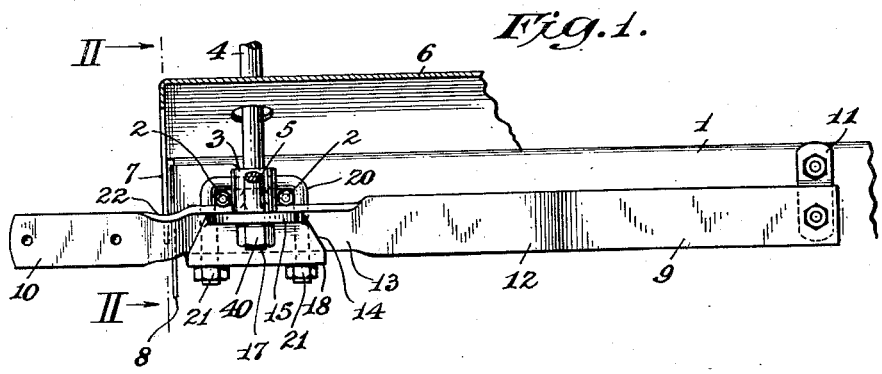
Fig.1.
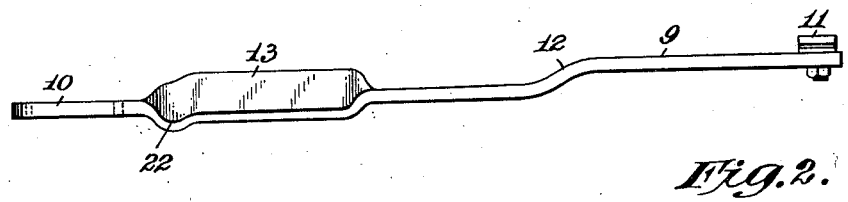
Fig.3.
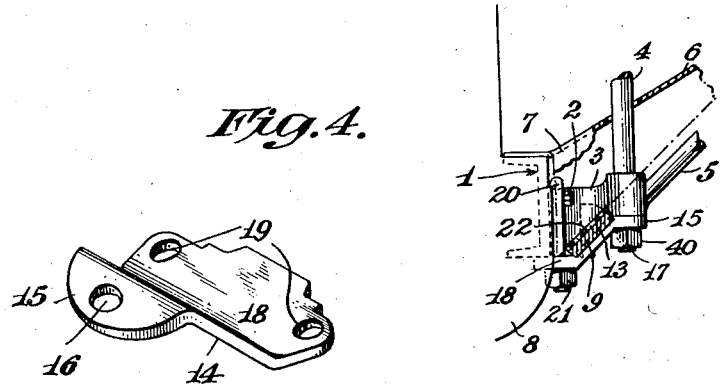
Fig.2.
Fig.4.
INVENTOR
OSCAR H. GOETZ
BY
John H. Hilliard
ATTORNEY Patented May 25, 1926.

1,586,303

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed July 30, 1924. Serial No. 729,030.

This invention relates to automobile bumper brackets, and my improvements are of special utility when embodied in the construction of brackets for attaching bumpers to automobiles of the standard Ford type, although I contemplate the use of my improvements in any field for which they are adapted by their nature.

A conventional form of attaching members for such bumper brackets comprises longitudinal arms, one on each side of the chassis, connected thereto at the rear of the fender and lamp-brackets, each arm having an inclined portion fitted against the angular portion of the lamp bracket and supported thereby, and an object of the invention is to provide improved means for securing these longitudinal arms to the lamp brackets and also to the chassis, for the purpose primarily of anchoring the bumper bracket more effectively against impacts, and also to provide a structure which can be installed on the chassis in proper position to accommodate the lateral extensions of the front vertical pan with which standard automobiles of this type are usually provided, without incurring the expense and delay involved in bending or otherwise altering the structure of such a pan, to provide clearance for the bumper bracket arms, the position of which would otherwise conflict with that of the pan.

Referring to the drawings:

Figure 1 is a fragmentary view showing in side elevation part of the front of a Ford car with the conventional left-hand fender and lamp-bracket in place, and a bumper-bracket attached thereto.

Figure 2 is a vertical section on the line II—II.

Figure 3 is a plan view of the bumper bracket, isolated.

Figure 4 is a perspective of an auxiliary bracket plate, isolated.

In the illustrated embodiment, the reference character 1 designates the front portion of the left-hand longitudinal chassis member of an automobile of the standard Ford type, to which is bolted at 2 a conventional fender bracket 3 provided with a lamp-post 4 secured in place by a nut 40, the bracket having the usual arm 5 to support the fender or mud guard 6, and the reference character 7 designates a portion thereof formed in continuation of the vertical front pan 8 commonly provided on cars of this type, extending laterally in front of the fender-and-lamp-bracket as indicated by the dash and dot line in Figure 2, this portion 7 of the vertical pan being broken away to reveal the lamp bracket and associated parts.

Along the frame member 1 extends a longitudinal arm 9 for the attachment of a bumper, which may be connected with the longitudinal arm by bolts or rivets fitted in holes provided as shown in the forward end 10 of the arm, and the longitudinal arm is preferably connected pivotally to the chassis member 1 by a link 11 to afford a slight adjustment of the arm, forward or backward, and thus permit manufacturing variations both in the arm and in the automobile.

This longitudinal arm is shown as offset at 12, and has a bend at 13 adjacent to the region of the fender-and-lamp-bracket 3, for the purpose of conforming the arm at that region to the lamp bracket so that the arm can be clamped firmly thereto. A similar arm, of symmetrical formation, will be provided for attachment to the right hand lamp-bracket of the automobile.

As improved means for so clamping the arms, I have shown an auxiliary bracket in the form of a plate 14 which may be of any suitable shape to accomplish the purpose of this invention, and which is shown as of the general shape of an inverted V, having on its outer side a lug 15 with a hole 16 to receive the lower threaded portion 17 of the lamp-post, being secured in place thereon by the nut 40. Upon its lower portion 18 each bracket or plate 14 is provided with holes 19, through which extend downwardly the legs of a U-bolt 20 which straddles the fender bracket, and is secured in place by nuts 21.

Each plate 14 may be used for either side of the car.

In accordance with another important feature of this invention, each longitudinal member 9 is provided at its bend 13 with a diagonal offset grooved portion 22 to accommodate the contiguous portion 7 of the vertical front pan, and the lower surface of this diagonal offset portion has the important function of serving in cooperation with the adjacent plate 14, against which it abuts, to resist lengthwise movements of the members 9 under the stress of impacts against the bumper.

Without further description, it will be seen that the improved attachment for bumpers herein illustrated and described adds notably to the rigidity of structure and permanence of adjustment of the parts, while being of simple and inexpensive construction, easy to make and install. It is further noteworthy that the improvements above described do not interfere with the use of the longitudinal attaching arms for the support of various types of bumper, and likewise that the longitudinal arms may be attached by the improved means upon automobiles not having the vertical pan herein illustrated.

Having thus described my invention, I claim:—

1. In a bumper attaching bracket, the combination with a motor vehicle chassis having a frame and a lamp-bracket provided with a lamp-post, of an attaching member having one of its ends adapted to be secured to the chassis frame, and means for supporting said member intermediate its ends, said means including a U-shaped bolt adapted to fit over said lamp bracket, and a plate provided with spaced apertures adapted to receive the ends of said bolt, said plate being provided with an extending portion apertured to receive said lamp-post.

2. In a bumper attaching bracket, the combination with a motor vehicle chassis having a frame and a lamp-bracket having a lamp-post with a downwardly extending threaded portion, of an attaching member having one of its ends adapted to be secured to the chassis frame, and means for supporting said member intermediate its ends, said means including a U-shaped bolt adapted to fit over said lamp bracket, and a plate provided with spaced apertures adapted to receive the ends of said bolt, said plate being provided with an extending portion apertured to receive said downwardly extending threaded portion of said lamp-post, and a nut upon said post to secure said plate and attaching member in assembled relation with said lamp-post and bracket.

3. In a bumper attaching bracket, the combination with a motor vehicle chassis having a frame and a lamp bracket provided with a lamp-post, of an attaching member having an intermediate portion bent at an angle to its body portion, said angular portion being secured to said lamp-bracket by a U-shaped bolt adapted to be seated on the arm of the lamp bracket, and a plate provided with apertures spaced apart and adapted to accommodate the ends of said bolt, said plate having also an extension adapted to be secured to said lamp-post, whereby said attaching member is rigidly fastened to the chassis.

4. In a bumper attaching bracket, the combination with a motor vehicle chassis having a frame and a lamp bracket, of an attaching member comprising a metal bar adapted to be connected at one end to said frame and at its other end to the bumper structure, the portion intermediate the ends of said member having a bend co-operating with the lamp bracket, and having in said bend an offset portion, a plate adapted to fit over said bend in abutting relation with said offset portion, and means to secure said plate to said lamp bracket, with said bend embraced therebetween.

5. A device for attaching bumpers to automobiles, said device comprising a longitudinal arm having means to permit it to be secured to the chassis of an automobile, rearward of a fender arm and lamp bracket thereon, said longitudinal arm having an inclined bend conforming to the structure of said lamp bracket; and in combination with said arm a clamping plate having a body portion to be engaged with said bend, and having a lug with a hole to receive the post of said lamp bracket and to be secured thereto by the conventional nut provided thereon, said plate having also an apertured portion fitted with a U-bolt to embrace the fender arm adjacent to said lamp-post.

6. A device for attaching bumpers to automobiles of the standard Ford type, said device comprising a longitudinal arm having means to permit it to be secured to the chassis of an automobile, rearward of a fender arm and lamp bracket thereon, said longitudinal arm having an inclined bend conforming to the structure of said lamp bracket; and in combination with said arm a clamping plate having a body portion to be engaged with said bend, and having a lug with a hole to receive the post of said lamp bracket and to be secured thereto by the conventional nut provided thereon, said plate having also an apertured portion fitted with a U-bolt to embrace the fender arm adjacent to said lamp bracket, and said bend having also a diagonal offset portion to abut against said plate and prevent longitudinal relative movement therebetween, serving also to accommodate the contiguous portion of a vertical front pan forming part of a standard automobile of this type.

7. An automobile bumper bracket arm comprising a bar to be secured to the chassis of an automobile of the standard Ford type having a lamp-bracket and a vertical front pan, said bar being adapted to extend forward in close relation to said lamp-bracket and front vertical pan, and having a bend to conform with the angular portion of said lamp-bracket and said bent portion having a diagonal offset to conform to the adjacent portion of said pan, permitting application of said bracket arm to said chassis without alteration of said pan.

8. A clamping plate for the attachment of a bumper bracket arm of the character set forth, to a fender arm provided with a lamp-post, said plate comprising a V-shaped body portion having at its apex a lug provided with a hole to receive said lamp post, and having its broader end apertured to receive a U-bolt to straddle said fender arm.

In witness whereof I have signed this specification.

OSCAR H. GOETZ.